(12) United States Patent
Fiacchino et al.

(10) Patent No.: US 12,510,126 B2
(45) Date of Patent: Dec. 30, 2025

(54) BRAKE ASSEMBLY

(71) Applicant: HB Performance Systems, Inc., Mequon, WI (US)

(72) Inventors: Steve R. Fiacchino, Port Washington, WI (US); Andrew J. Doubek, Grafton, WI (US); Peter E. True, West Bend, WI (US)

(73) Assignee: HB Performance Systems, Inc., Mequon, WI (US)

( * ) Notice: Subject to any disclaimer, the term of this patent is extended or adjusted under 35 U.S.C. 154(b) by 457 days.

(21) Appl. No.: 18/151,581

(22) Filed: Jan. 9, 2023

(65) Prior Publication Data

US 2024/0229873 A1   Jul. 11, 2024

(51) Int. Cl.
*F16D 55/2255* (2006.01)
*F16D 55/2265* (2006.01)
*F16D 55/227* (2006.01)

(52) U.S. Cl.
CPC ... *F16D 55/2255* (2013.01); *F16D 55/22655* (2013.01); *F16D 55/227* (2013.01)

(58) Field of Classification Search
CPC .......... F16D 55/2255; F16D 55/22655; F16D 55/227
See application file for complete search history.

(56) References Cited

U.S. PATENT DOCUMENTS

| | | | |
|---|---|---|---|
| 3,059,731 A * | 10/1962 | Gancel | F16D 55/2255 188/71.9 |
| 3,463,274 A | 8/1969 | Hollnagel et al. | |
| 3,743,060 A | 7/1973 | Hendrickson | |
| 5,038,895 A | 8/1991 | Evans | |
| 5,647,459 A | 7/1997 | Buckley et al. | |
| 7,040,462 B2 | 5/2006 | Dennis et al. | |
| 2009/0266654 A1 | 10/2009 | Holland | |

OTHER PUBLICATIONS

Extended European Search Report for Application No. 24150308.5 dated May 29, 2024 (10 pages).

* cited by examiner

*Primary Examiner* — David R Morris
(74) *Attorney, Agent, or Firm* — Boyle Fredrickson, S.C.

(57) ABSTRACT

A brake assembly for use with a rotating shaft such as on the wheel of a vehicle or on industrial equipment. The brake assembly includes a first brake pad, a second brake pad, a lever having a plurality of concave surfaces and corresponding plurality of convex surface, a bracket, a ball bearing moveable into and out of each of the plurality of concave surfaces and a spacer positioned between the lever and the second brake pad. The spacer contacts the lever radially outwardly of the convex surfaces.

20 Claims, 8 Drawing Sheets

BRAKE ASSEMBLY

FIELD OF THE INVENTION

The invention relates to a brake assembly for a rotating shaft, and more particularly, to a ball ramp type brake assembly.

BACKGROUND OF THE INVENTION

Ball ramp type brake assemblies include several bearings. If braking torque is required, the bearings are moved into depressions thus causing a pair of brake pads to create braking torque. One drawback of this type of brake assembly is that the depressions often have convex surfaces to be dealt with in the load transfer path. There is a need for a ball ramp type brake assembly with a better solution to dealing with the convex surfaces to achieve increased evenness of force applied to the brake pads which will improve overall performance and pad wear of the brake assembly.

SUMMARY OF THE INVENTION

In one construction, the disclosure provides a brake assembly comprising a first brake pad, a second brake pad, a lever having a plurality of concave surfaces and corresponding plurality of convex surface, a ball bearing housed in each of the plurality of concave surfaces and a spacer positioned between the lever and the second brake pad, the spacer having a surface adapted to surround the convex surfaces and to contact the lever radially outwardly of the convex surfaces.

In another construction, the disclosure provides a brake assembly comprising a first brake pad, a second brake pad, a lever having a plurality of concave surfaces and corresponding plurality of convex surface, a ball bearing housed in each of the plurality of concave surfaces, a thrust bearing and a spacer positioned between the lever and the thrust bearing, the spacer having a first surface adapted to contact the lever radially outwardly of the convex surfaces and having a second surface adapted to contact the thrust bearing.

In another construction, the disclosure provides a brake assembly comprising a first brake pad, a second brake pad, a lever having a plurality of concave surfaces and corresponding plurality of convex surface, a bracket, a plurality of outer pins, a center pin, a ball bearing housed in each of the plurality of concave surfaces, a thrust bearing and a spacer positioned between the lever and the second brake pad, the spacer having a ring shaped surface adapted to contact the lever radially outwardly of the convex surfaces and having a disc shaped surface adapted to contact the thrust bearing.

Other aspects of the disclosure will become apparent by consideration of the detailed description and accompanying drawings.

DETAILED DESCRIPTION OF THE INVENTION

Before any constructions of the disclosure are explained in detail, it is to be understood that the disclosure is not limited in its application to the details of construction and the arrangement of components set forth in the following description or illustrated in the following drawings. The disclosure is capable of other constructions and of being practiced or of being carried out in various ways.

Figure 1:
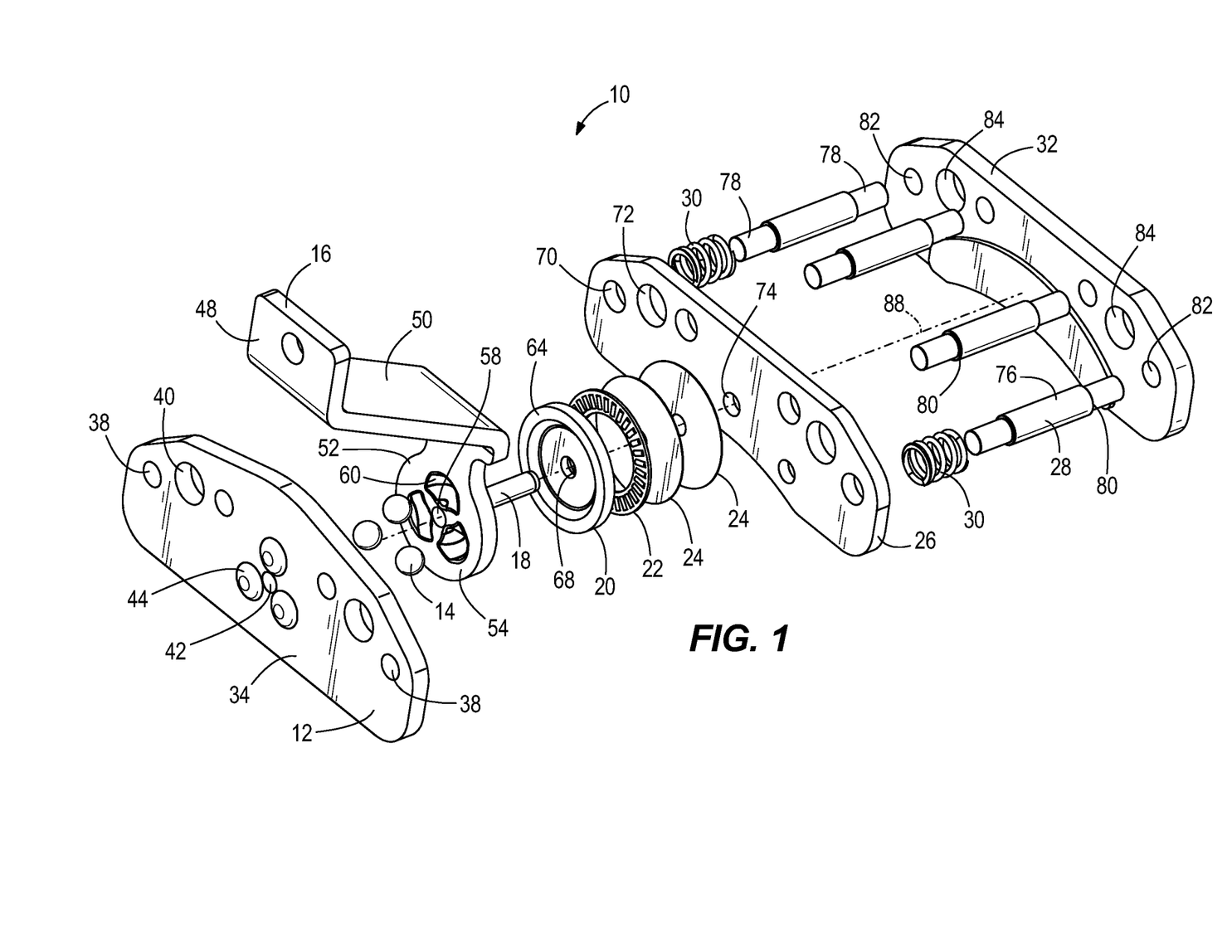
FIG. 1 is a perspective view of a brake assembly according to the invention.

FIG. 1 illustrates a brake assembly 10 for a rotating shaft according to the invention. The brake assembly 10 is of the ball ramp type and can be used on a variety of rotating shafts on vehicles and on industrial equipment, such as, for example, zero turn lawn movers, utility vehicles, non-motorized vehicles and industrial equipment having a rotating shaft where braking is needed. The brake assembly 10 is used with and mounted to the rotating shaft as is known in the art and thus not shown.

The brake assembly 10 includes bracket 12, ball bearings 14, lever 16, center pin 18, spacer 20, thrust bearing 22, shims 24, inner brake pad 26, double shoulder pins 28, springs 30 and outer brake pad 32. FIGS. 2-6 show the brake assembly 10 and parts thereof in an assembled orientation.

Figure 7:
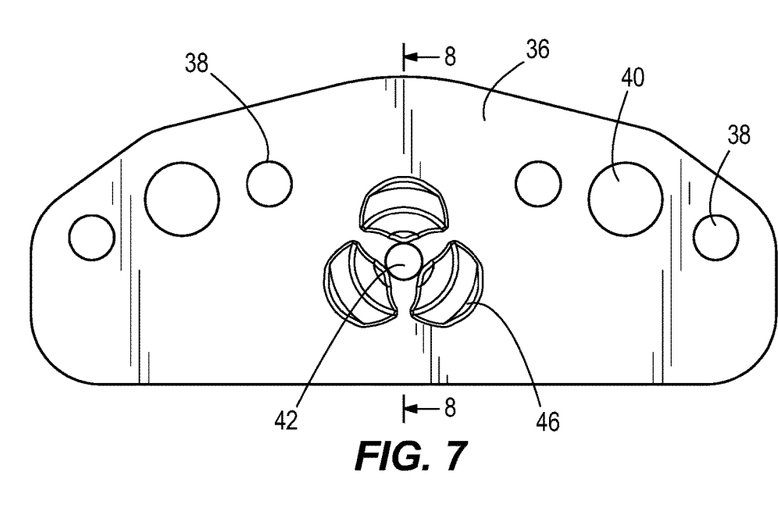
FIG. 7 is an end view of a bracket.
Figure 8:
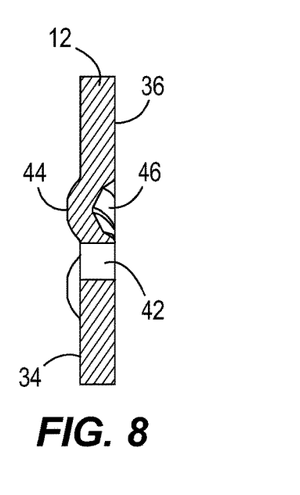
FIG. 8 is a sectional view taken along line 8-8 of FIG. 7.

With reference to FIGS. 1, 7 and 8, the bracket 12 has on outer surface 34, an inner surface 36, apertures 38 and 40, and a center aperture 42. The outer surface 34 has convex surfaces 44 and the inner surface 36 has concave surfaces 46 for housing the ball bearings 14. The bracket 12 is preferably fabricated of metal or steel, however, other materials can also be utilized.

With reference to FIG. 1, preferably the brake assembly 10 utilizes three ball bearings 14, however, other quantities can also be utilized. The ball bearings 14 are dimensioned to fit in the concave surfaces 46 on the inner surface 36 of the bracket 12 and are preferably fabricated of metal or steel, however, other materials can also be utilized.

Figure 9:
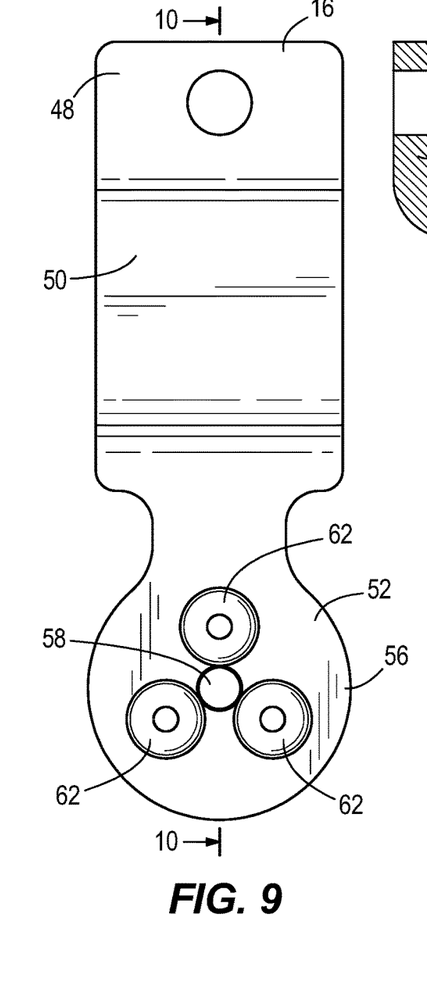
FIG. 9 is an end view of a lever.
Figure 10:
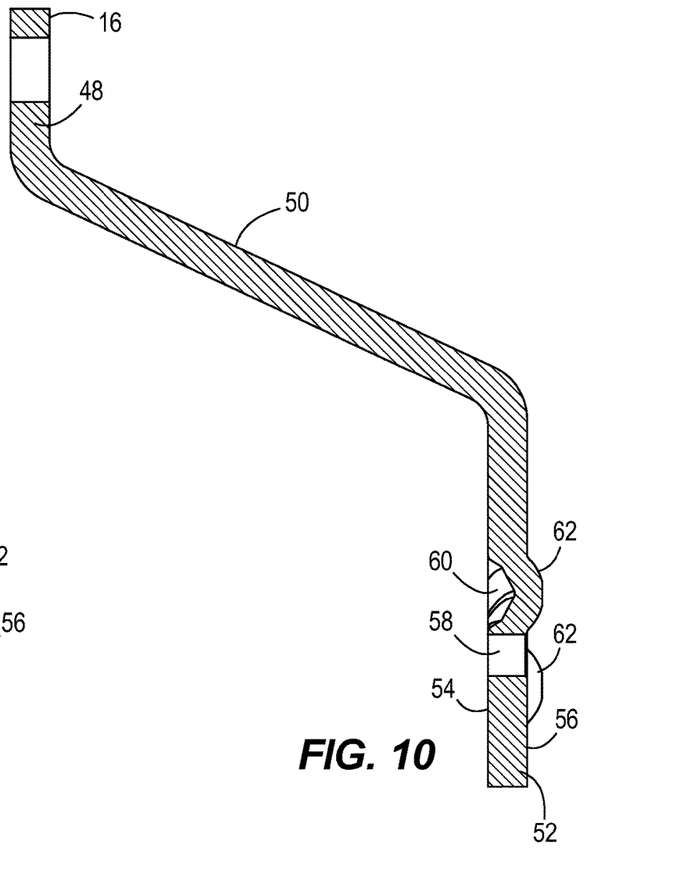
FIG. 10 is a section view taken along line 10-10 of FIG. 9.

With references to FIGS. 1, 9 and 10 in particular, the lever 16 includes a first rectangular portion 48, a second rectangular portion 50 at an angle to the first rectangular portion 48, and a circular portion 52. It should be noted that the lever 16 can be of other shapes as is known in the art. The circular portion 52 has a first surface 54, a second surface 56 and a center aperture 58. The first surface 54 includes concave surfaces 60 for housing the bearings 14. The second surface 56 has thereon convex surfaces 62.

Figure 11:
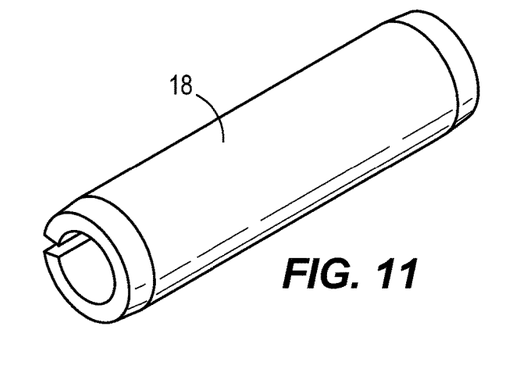
FIG. 11 is a perspective view of a center pin.

With reference to FIGS. 1 and 11, the center pin 18 extends from the bracket 12 to the inner brake pad 26 when the brake assembly 10 is assembled. It is preferably a roll pin fabricated of metal or steel, however, other types and materials can also be utilized.

Figure 12:
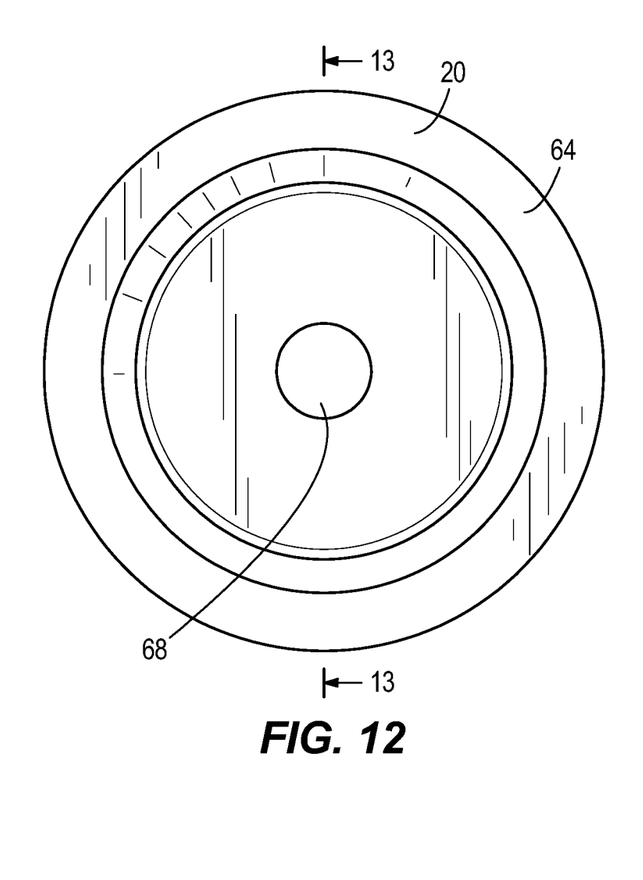
FIG. 12 is an end view of a spacer.
Figure 13:
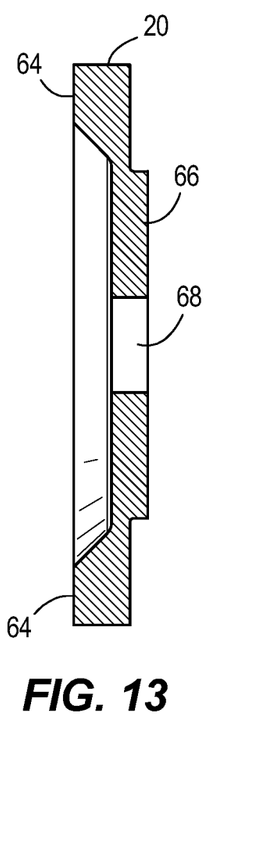
FIG. 13 is a sectional view taken along line 13-13 of FIG. 12.

With reference to FIGS. 1, 12 and 13, the spacer 20 is a piece of material with a customized shape to create a space between two otherwise adjoining elements and to transmit a load between those two elements. The spacer 20 as shown creates a space between the lever 16 and inner brake pad 26. The spacer 20 has a first surface 64 that contacts the lever 16 radially outwardly of the convex surfaces 62 on the lever 16 so as to surround the convex surfaces 62. Preferably, the first surface 64 is a ring shaped surface, however, other shapes can also be utilized. The spacer 20 also includes a second surface 66. Preferably, the second surface 66 is disc shaped, however, other shapes can also be utilized. The spacer 20 includes a center aperture 68. The spacer 20 is preferably fabricated of low carbon steel such as 1045 steel, however, other materials can also be utilized. It should be noted that other spacer shapes can be utilized to perform the same functions such as other circular, oval, rectangular or irregular shapes.

Figure 14:
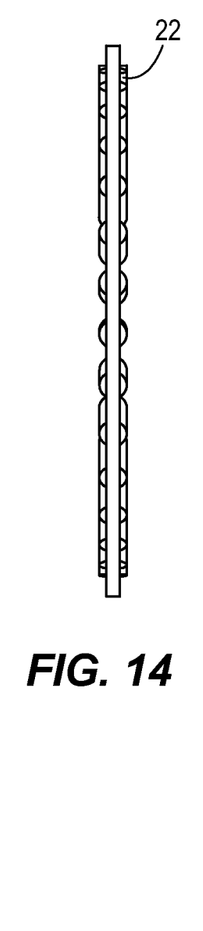
FIG. 14 is a side view of a thrust bearing.

With references to FIGS. 1 and 14, the thrust bearing 22 is adjacent the spacer 20. Preferably, the thrust bearing 22 is a thrust needle bearing, however, other types of bearings can also be utilized. The thrust bearing 22 is preferably utilized to manage friction in the brake assembly 10 if needed.

Figure 15:
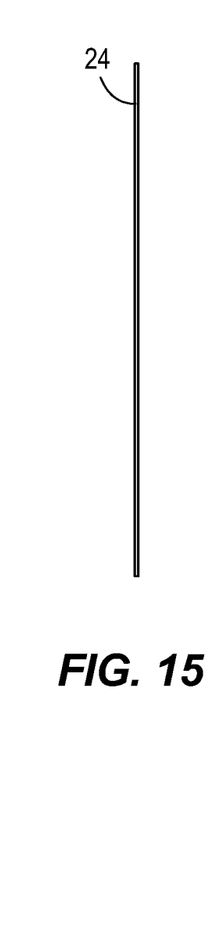
FIG. 15 is a side view of a shim.

With reference to FIGS. 1 and 15, shims 24 are utilized as needed. Two shims 24 are shown, however, other quantities of shims can be utilized. Preferably, the shims 24 are fabricated of metal or steel, however, other materials can also be utilized.

Figure 16:
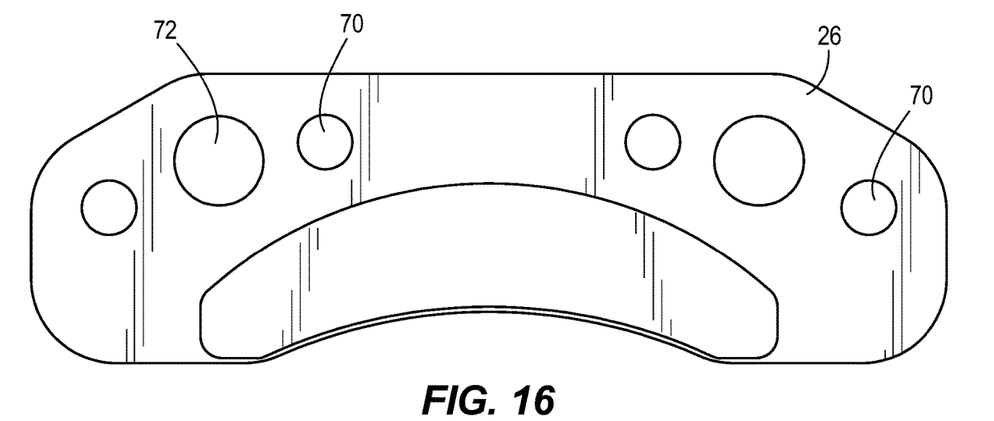
FIG. 16 is an end view of an inner brake pad.

With reference to FIGS. 1 and 16, the inner brake pad 26 includes apertures 70 and 72 and a center aperture 74. It is preferably fabricated of metal or steel, however, other materials can also be utilized.

Figure 17:
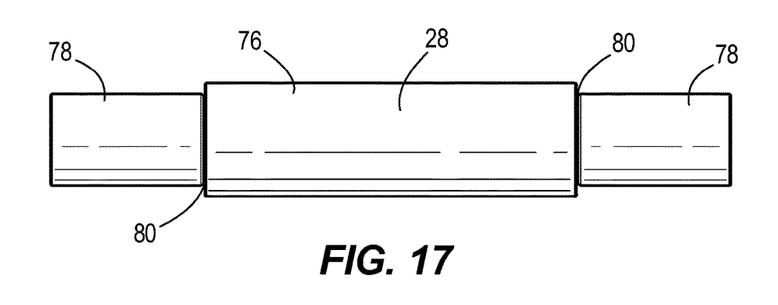
FIG. 17 is a side view of a double shoulder pin.

With reference to FIGS. 1 and 17, there are preferably four double shoulder pins 28, however, other quantities of pins can also be utilized. The double shoulder pins 28 extend from the bracket 12 to the outer brake pad 32 when the brake assembly 10 is assembled. The double shoulder pins 28 include a central larger diameter portion 76, a smaller diameter portion 78 on each side of the central larger diameter portion 76, and a shoulder surface 80 at the transition between the central larger diameter portion 76 and each smaller diameter portion 78. The double shoulder pins 28 take the load when the brake assembly 10 is in operation and also function to resist deflection of the brake assembly 10. The shoulder surface 80 of the double shoulder pins 28 also supports a riveting operation during assembly of the brake assembly 10.

With reference to FIG. 1, springs 30 surround two of the double shoulder pins 28 and function to maintain the ball bearings 14 in their initial position prior to use. The springs 30 are preferably fabricated of wire with a zinc plating, however, other materials can also be utilized.

Figure 3:
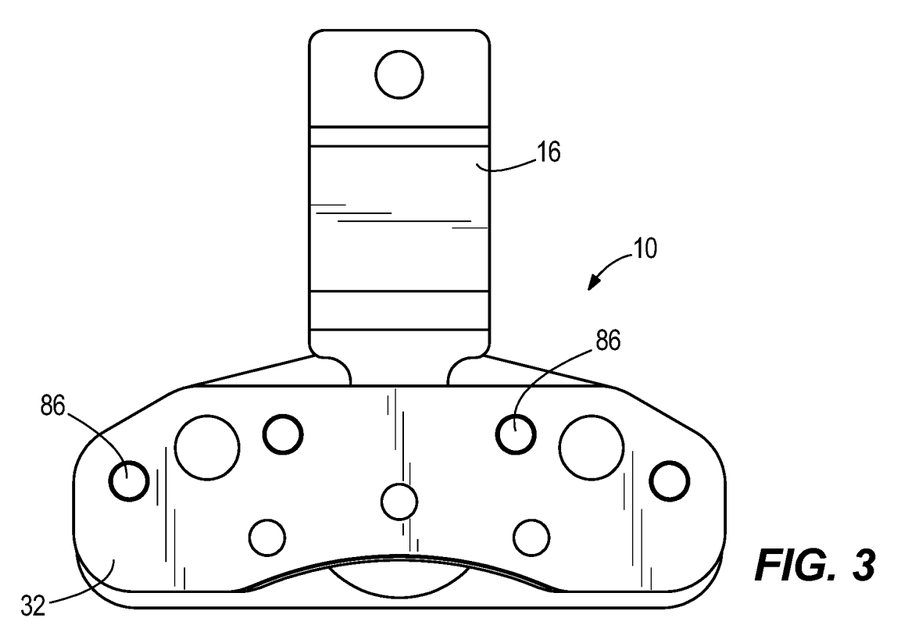
FIG. 3 is an end view of the brake assembly.

With reference to FIGS. 1 and 3, the outer brake pad 32 includes apertures 82 and 84. It is preferably fabricated of metal or steel, however, other materials can also be utilized.

Figure 2:
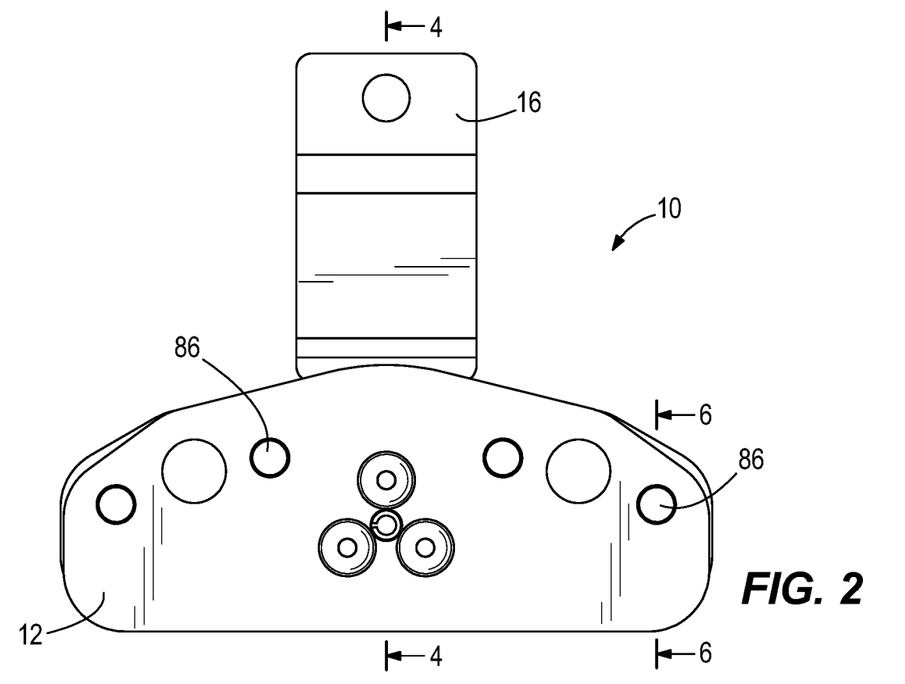
FIG. 2 is an end view of the brake assembly.
Figure 4:
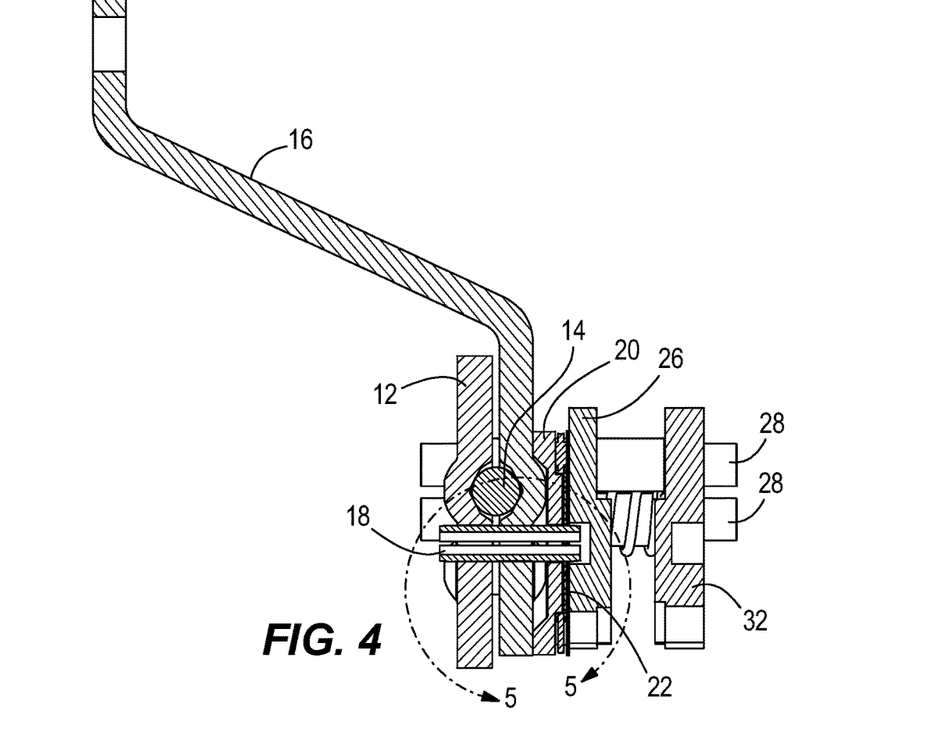
FIG. 4 is a sectional view taken along line 4-4 of FIG. 2.
Figure 5:
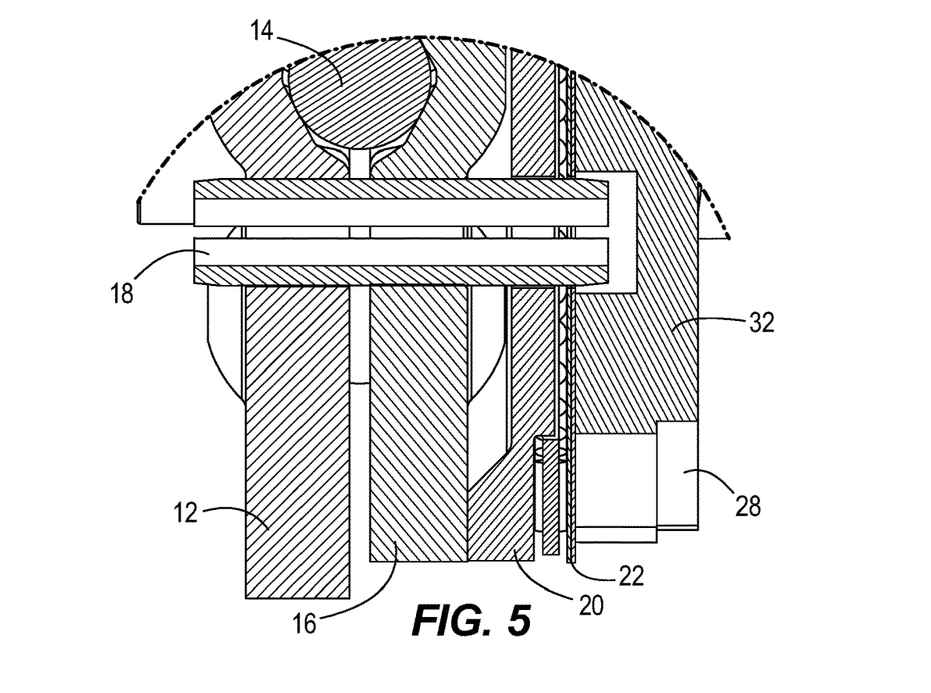
FIG. 5 is a sectional view taken along line 5-5 of FIG. 4.
Figure 6:
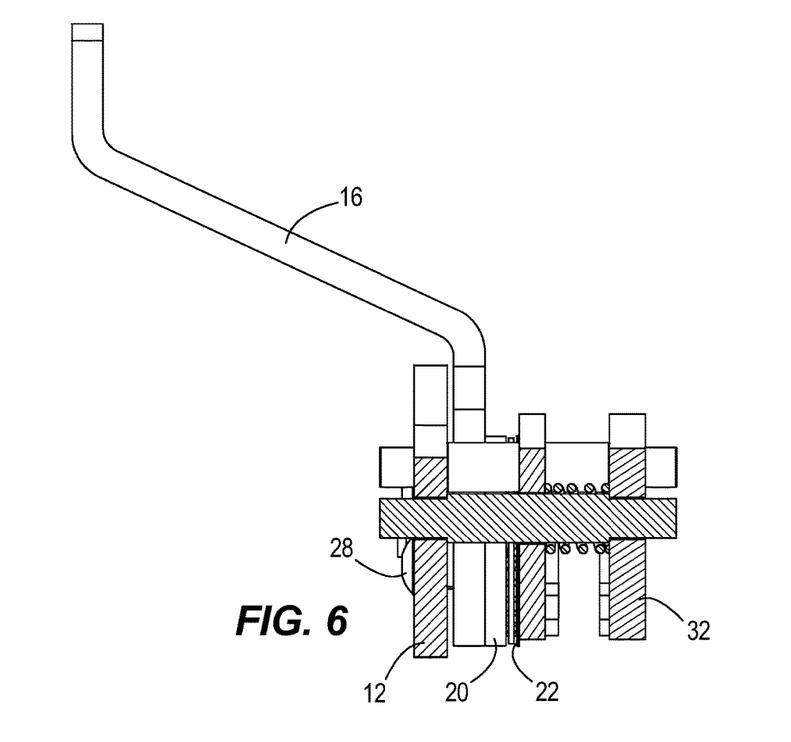
FIG. 6 is a sectional view taken along line 6-6 of FIG. 2.

Turning now to the assembled orientation of the brake assembly 10, FIGS. 2 and 3 depicted the assembled brake assembly 10 in end views. FIGS. 4, 5 and 6 depicted various assembled views. The double shoulder pins 28 extend from the bracket 12 to the outer brake pad 32. Rivets 86, as are known in the art, are preferably utilized during final assembly at both ends of the double shoulder pins 28 to hold the brake assembly 10 in its assembled orientation. The center pin 18 extends from bracket 12 to the inner brake pad 26 and defines a central axis 88.

Figure 18:
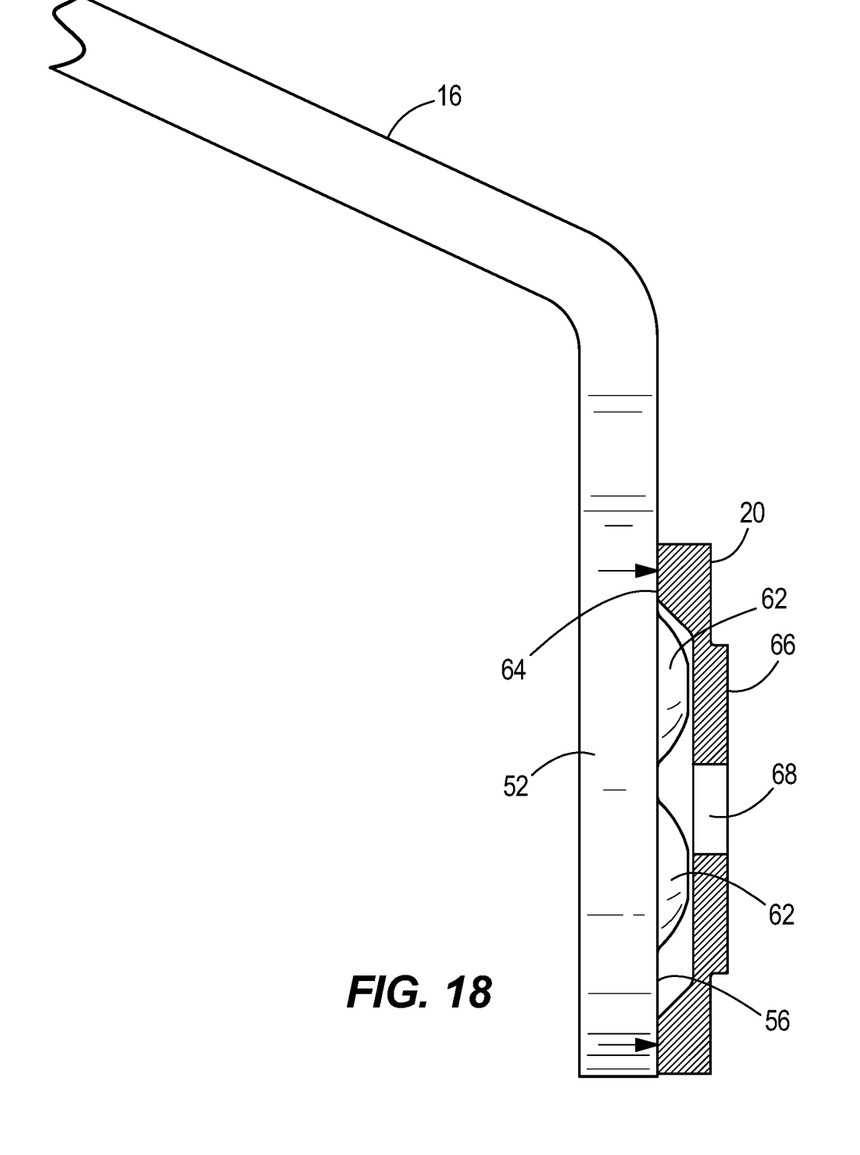
FIG. 18 is a side view of the lever and the spacer.

With specific reference to FIG. 18, the surface 64 of the spacer 20 contacts the lever 16 radially outwardly of the convex surfaces 62 on the circular portion 52 of the lever 16 such that the spacer 20 does not contact with the convex surfaces 62 themselves. The spacer 20 functions to provide an optimum and even load path from the lever 16 to the brake pads 26 and 32 by taking advantage of the complete available surface area and flatness of the second surface 56 of the circular portion 52 of the lever 16. Use of a spacer 20 thus has the advantages of a more even force applied to the inner brake pad 26 which results in improved overall performance and efficiency, better and more even brake pad wear, and a longer brake assembly 10 life span.

In use, the load transfer path is as follows. The applied tangential force at the lever 16 is transferred to axial force at the surface 56 of the lever 16 around a pivot location at the center aperture 58. This is the result of the bearing 14 interaction at the lever 16 and the bracket 12, and the reaction force from the inner pad 26. The load at the lever surface 56 is then distributed across a plane which is contacted by the spacer 20. As such, without point contacts and point loads, the spacer 20 contacts the surface 56 of the lever 16 and enables even load transfer and even pad force distribution.

Various features and advantages of the invention are set forth in the following claims.

What is claimed is:

1. A brake assembly comprising:
   a first brake pad;
   a second brake pad;
   a lever having a plurality of concave surfaces and corresponding plurality of convex surfaces;
   a ball bearing housed in each of the plurality of concave surfaces; and
   a spacer positioned between the lever and the second brake pad, the spacer having a surface adapted to surround the convex surfaces and to contact the lever radially outwardly of the convex surfaces.

2. The brake assembly of claim 1 wherein the lever is bent.

3. The brake assembly of claim 1 and further including a plurality of outer pins.

4. The brake assembly of claim 3 wherein the plurality of outer pins have double shoulders.

5. The brake assembly of claim 3 wherein the plurality of outer pins is four outer pins.

6. The brake assembly of claim 3 and further including springs surrounding at least one of the plurality of outer pins.

7. The brake assembly of claim 3 wherein the plurality of outer pins extends from the first brake pad to a bracket.

8. The brake assembly of claim 1 and further including a plurality of shims positioned between the spacer and the second brake pad.

9. The brake assembly of claim 8 wherein the shim adjacent the spacer is not moveable relative to the spacer.

10. The brake assembly of claim 8 wherein the plurality of shims is rotatable relative to each other.

11. The brake assembly of claim 1 wherein the spacer is fabricated of low carbon steel.

12. The brake assembly of claim 1 wherein the surface of the spacer contacting the lever is ring shaped.

13. The brake assembly of claim 1 and further including a center pin.

14. The brake assembly of claim 13 wherein the center pin extends through the lever, the spacer, and the second brake pad.

15. The brake assembly of claim 1 wherein the plurality of concave surfaces is three concave surfaces.

16. The brake assembly of claim 1 wherein the surface of the spacer contacting the lever is adapted to evenly transfer load to the first and second brake pads.

17. A brake assembly comprising:
a first brake pad;
a second brake pad;
a lever having a plurality of concave surfaces and corresponding plurality of convex surfaces;
a ball bearing housed in each of the plurality of concave surfaces;
a thrust bearing; and
a spacer positioned between the lever and the thrust bearing, the spacer having a first surface adapted to contact the lever radially outwardly of the convex surfaces and having a second surface adapted to contact the thrust bearing.

18. The brake assembly of claim 17 wherein the first surface is ring shaped and the second surface is disc shaped.

19. The brake assembly of claim 17 wherein the thrust bearing is a needle bearing.

20. A brake assembly comprising:
a first brake pad;
a second brake pad;
a lever having a plurality of concave surfaces and corresponding plurality of convex surfaces;
a bracket;
a plurality of outer pins;
a center pin;
a ball bearing housed in each of the plurality of concave surfaces;
a thrust bearing; and
a spacer positioned between the lever and the second brake pad, the spacer having a ring shaped surface adapted to contact the lever radially outwardly of the convex surfaces and having a disc shaped surface adapted to contact the thrust bearing.

* * * * *